United States Patent [19]

Townsend

[11] 4,176,676
[45] Dec. 4, 1979

[54] MEANS FOR CONVERTING A WATER DRIVE CENTER PIVOT IRRIGATION SYSTEM TO AIR DRIVE

[76] Inventor: Loren R. Townsend, Apartment 4, #5 Olympic Gardens, York, Nebr. 68467

[21] Appl. No.: 902,440

[22] Filed: May 3, 1978

Related U.S. Application Data

[63] Continuation-in-part of Ser. No. 866,558, Jan. 3, 1978.

[51] Int. Cl.$^2$ ............................................. B05B 3/12
[52] U.S. Cl. ...................................... 137/344; 91/313; 239/177
[58] Field of Search ................ 137/344; 239/177, 212, 239/213; 91/308, 313

[56] References Cited

U.S. PATENT DOCUMENTS

| | | | |
|---|---|---|---|
| 3,916,942 | 11/1975 | Townsend | 137/344 |
| 4,083,378 | 4/1978 | Stearns | 137/344 |

*Primary Examiner*—Gerald A. Michalsky
*Attorney, Agent, or Firm*—Zarley, McKee, Thomte, Voorhees & Sease

[57] ABSTRACT

A method and means for converting a water drive center pivot irrigation system to air drive is described whereby the more economical air drive is substituted for the water drive on each of the drive towers. The water drive cylinder on each of the drive towers of the system is modified to function as an air cylinder which is operatively connected to the trojan bar on the drive tower whereby actuation of the air cylinder will cause the trojan bar to be reciprocally moved to drive at least one of the drive wheels on the tower. An alignment panel is mounted on the drive tower and is connected to the air cylinder for controlling the operation of the same. The alignment panel is operatively secured to the existing alignment control apparatus on the drive tower so that the alignment panel will function in response to the alignment control apparatus. An air compressor is preferably placed at the well site and is connected to each of the alignment panels and to the drive cylinder on the lead tower for supplying air thereto under pressure.

1 Claim, 6 Drawing Figures

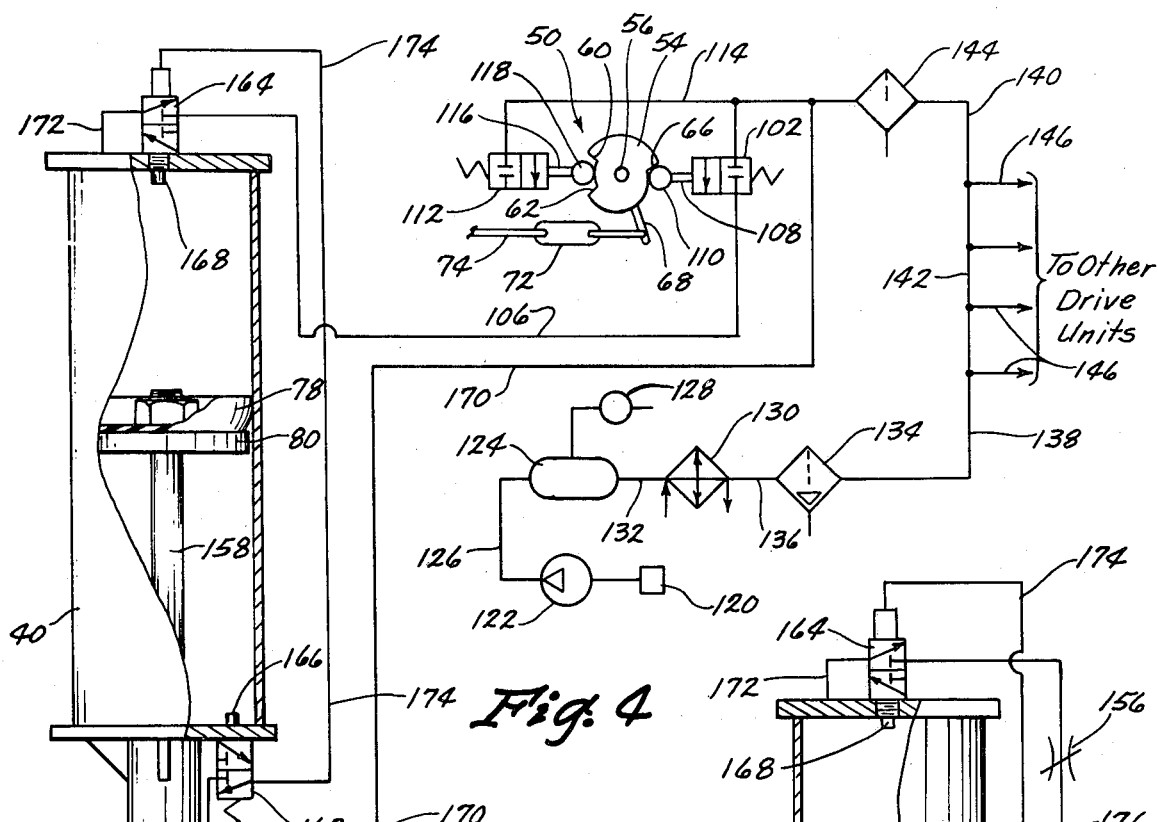
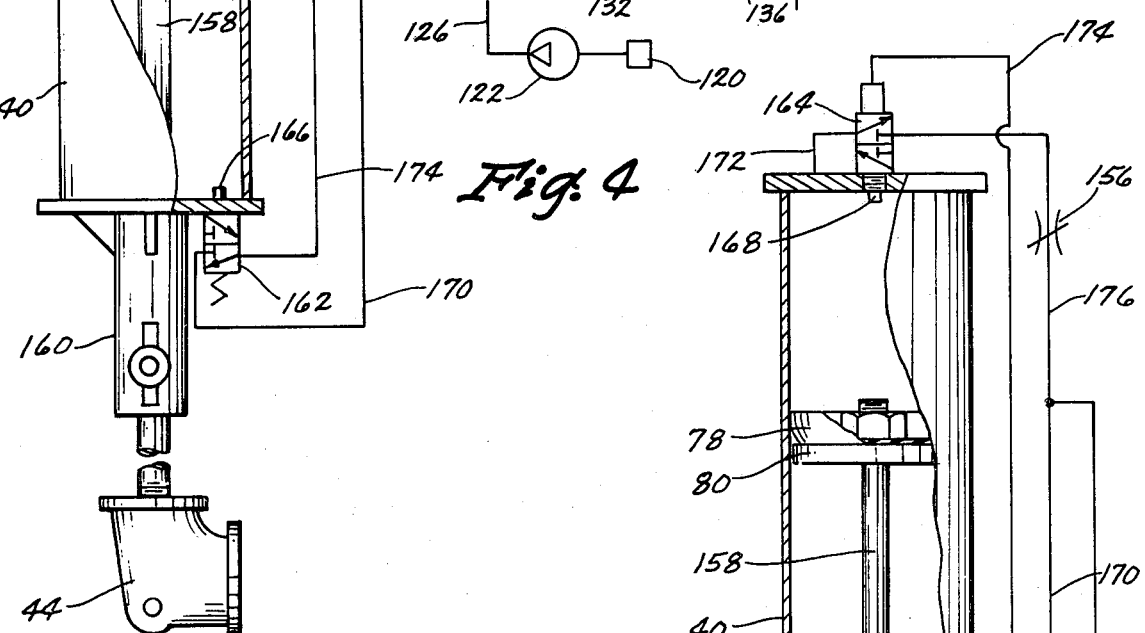
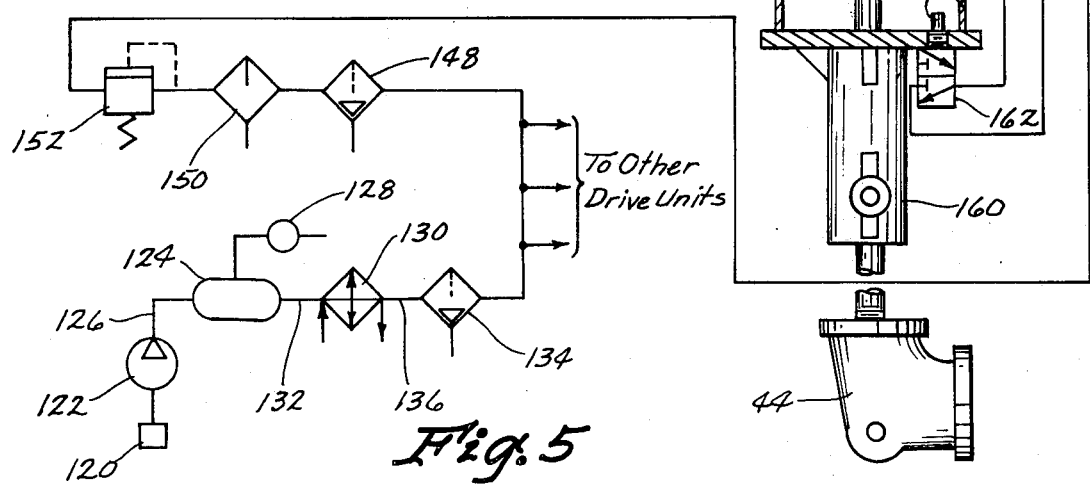

MEANS FOR CONVERTING A WATER DRIVE CENTER PIVOT IRRIGATION SYSTEM TO AIR DRIVE

BACKGROUND OF THE INVENTION

This is a continuation-in-part application of Ser. No. 866,558 filed Jan. 3, 1978.

This invention relates to a method and means for converting a water drive center pivot irrigation system to air drive.

Thousands of water drive center pivot irrigation systems are in operation with one of the most notable systems being manufactured by Valmont Industries, Inc. of Valley, Nebr. The Valmont water drive systems comprise a water drive cylinder which is mounted on each of the drive towers and which is connected to a trojan bar which engages at least one of the drive wheels so that operation of the water drive cylinder causes the drive wheel to be rotated a predetermined amount.

The water required to operate the cylinders is taken from the sprinkler pipeline at each individual drive tower or unit. The power developed by the individual drive cylinder is dependent upon the water pressure that is available at that particular drive unit. Due to the friction created within the water pipe as the water is pumped through the system, the water pressure available at the individual drive units decreases as the distance from the pivot point increases. It is apparent that those drive units usually requiring the most power have the least available water pressure and therefore the least power for propulsion. After the water has been used in the cylinder for the power stroke, it is discharged in an area relatively close to the drive unit which interferes with the traction of the drive wheels and detracts from the desired water application pattern on the crop.

In those areas where a relatively large amount of sand is pumped from the well with the water, higher maintenance costs are created by the abrasiveness of the sand in the valves and cylinders. Since the system depends upon water pressure for its propulsion, it cannot be moved without spraying water upon the ground it is moved over. This is a disadvantage where the system is to be moved over a crop that is ready to harvest. Further, the dependency of the system upon water pressure for propulsion eliminates the possibility of using "low pressure" sprinkler designs. This disadvantage is apparent in today's awareness of the cost and availability of energy.

If the owner of a water drive system is dissatisfied with the operation of the system due to the problems enumerated above, he must replace the system with an expensive electric drive such as that manufactured by Sargent Manufacturing Company of Othello, Wash. or the air drive system such as that previously manufactured by Sidney Manufacturing Company of Sidney, Nebr.

Therefore, it is a principal object of the invention to provide a method and means for converting a water drive center pivot irrigation system to air drive.

A still further object of the invention is to provide a method of converting a water drive center pivot irrigation system to air drive which requires no cutting, welding, structural or mechanical changes to the existing system.

A still further object of the invention is to provide a method and means for converting a water drive center pivot irrigation system to air drive whereby the water distribution pattern will be improved.

A still further object of the invention is to provide a method of converting a water drive center pivot irrigation system to air drive which prevents wasting water through the drive system.

A still further object of the invention is to provide a method of converting a water drive center pivot irrigation system to air drive to prevent the dumping of water from the drive system into the wheel tracks.

A still further object of the invention is to provide a method of converting a water drive center pivot irrigation system to air drive which permits the system to be moved through the field without the necessity of pumping water therethrough.

A still further object of the invention is to provide a method of converting a water drive center pivot irrigation system to air drive which is economical.

These and other objects will be apparent to those skilled in the art.

BRIEF DESCRIPTION OF THE DRAWINGS

FIG. 4 is a schematic view of a modified form of the air drive conversion:

FIG. 5 is a view similar to FIG. 4 except that it shows the circuitry for the lead tower.

BRIEF DESCRIPTION OF THE METHOD AND MEANS

Figure 1:
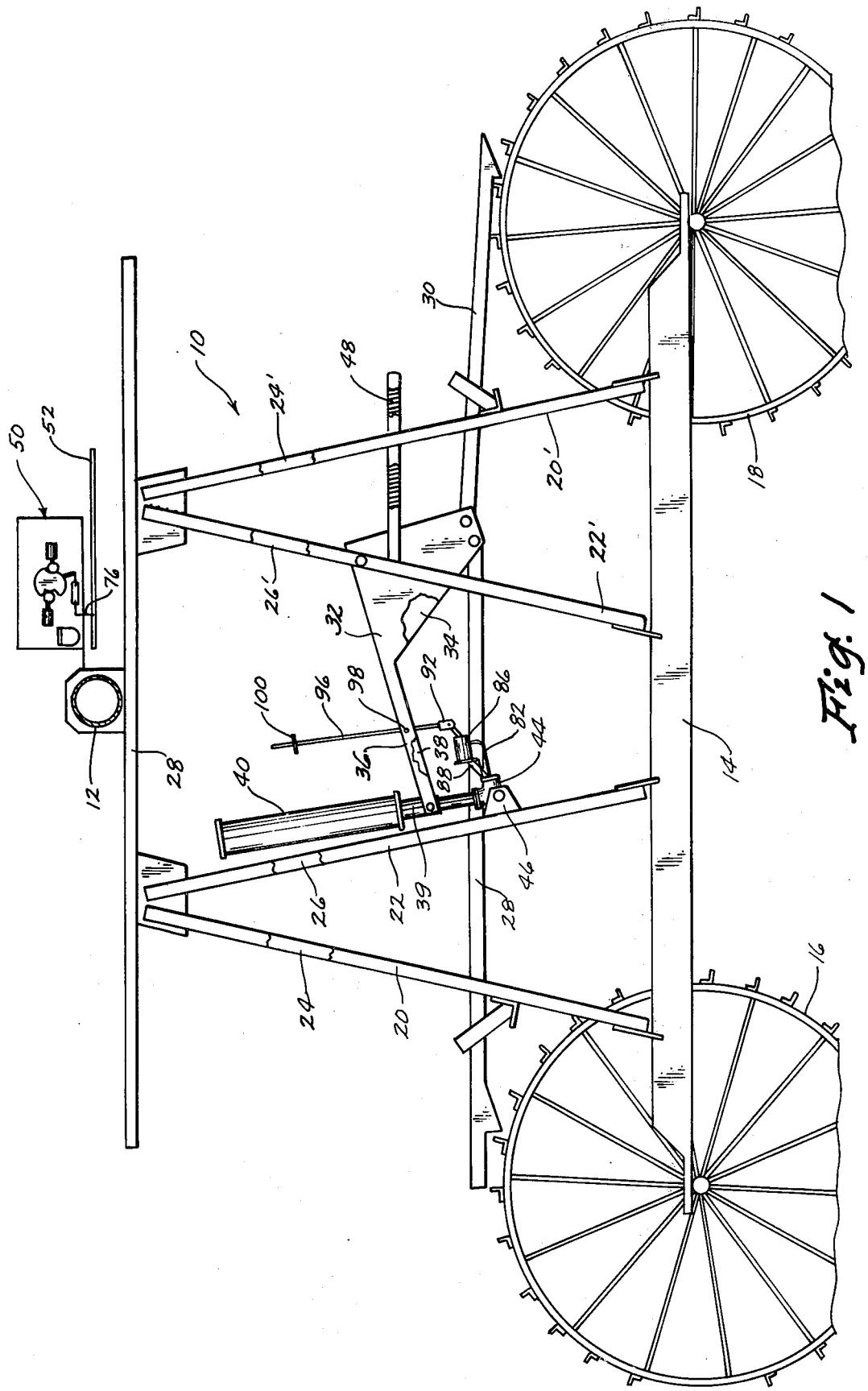
FIG. 1 is a partial end view of a conventional water drive center pivot irrigation system having the air drive of this invention mounted thereon.

The numeral 10 refers generally to a drive tower or unit such as that employed by Valmont Industries, Inc. of Valley, Nebr. A plurality of the drive units 10 are spaced along the length of an overhead pipe referred to generally by the reference numeral 12. The drive units 10 are designed to pivot the irrigation pipe 12 around a center pivot so that water may be sprinkled over the area beneath the system.

Each of the drive units 10 comprises a horizontally disposed frame member 14 having drive wheels 16 and 18 rotatably mounted at the opposite ends thereof. Frame members 20 and 22 are secured at their lower ends to frame member 14 and extend upwardly therefrom in a converging relationship. Likewise, a pair of frame members 24 and 26 are secured at their lower ends to frame member 14 and extend upwardly therefrom in a converging manner. The upper ends of the frame members 20, 22, 24 and 26 are secured to a horizontally extending frame member 28. Frame members 20', 22', 24' and 26' are secured to the other end of frame member 14 and extend upwardly to the frame member 28 as illustrated in the drawings.

Figure 2:
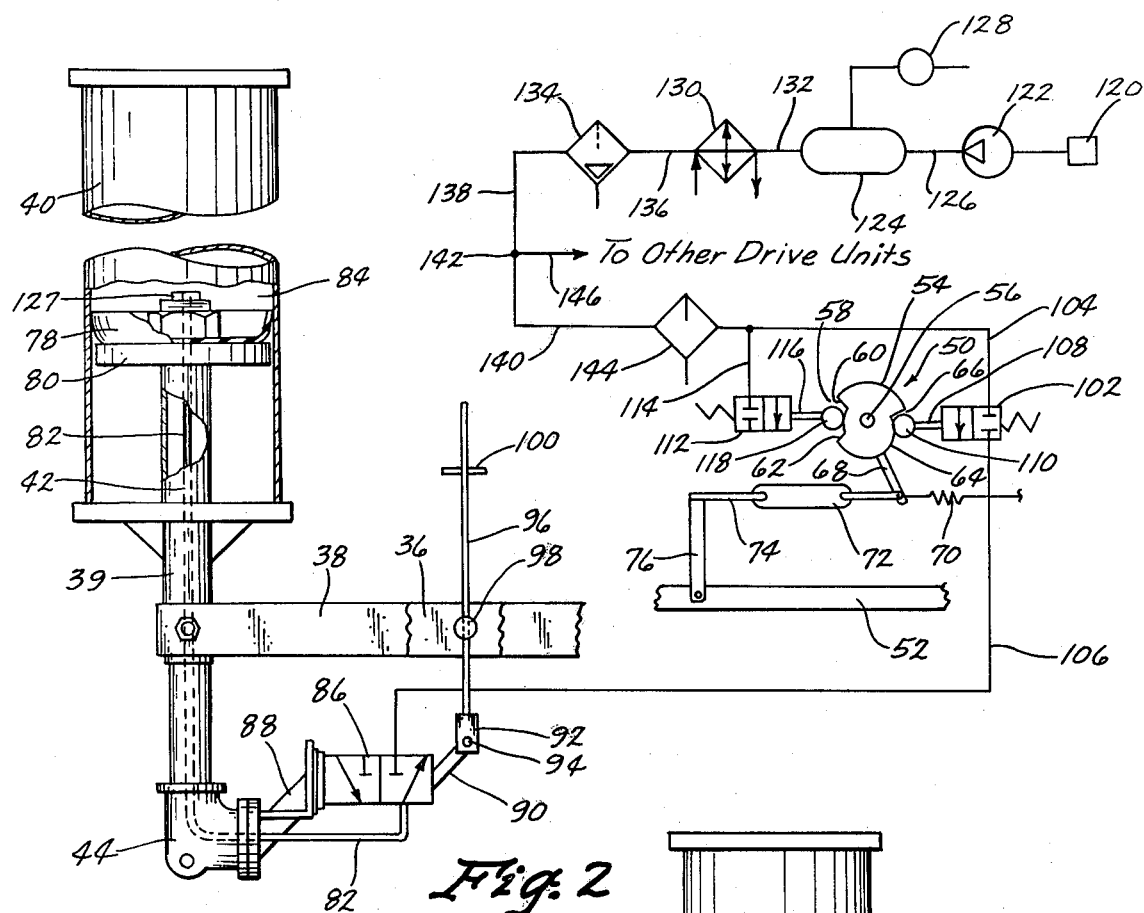
FIG. 2 is a schematic view of the air drive of FIG. 1.

Trojan bars 28 and 30 are pivotally connected to a pair of spaced-apart plates 32 and 34 as illustrated in FIG. 1. Trojan bars 28 and 30 engage the drive lugs on the drive wheels 16 and 18 in conventional fashion to move the drive unit to the left as will be described in more detail hereinafter. Arms 36 and 38 extend from plates 32 and 34 and are secured to a yoke assembly 39 secured to the cylinder 40 as best seen in FIG. 2. Water pipe 42 extends downwardly from the interior of the cylinder 40 and slidably extends through the yoke 39. Prior to being modified, the cylinder 40 would have a water seal (not shown) mounted on the inner end of the pipe 42 which acts as a piston so that the body of the cylinder 40 will be moved upwardly with respect to the pipe 42 and piston thereon as water under pressure is supplied to the upper interior end of the cylinder.

The lower end of pipe 42 is secured to a casting 44 which is pivotally secured to a bracket assembly 46 mounted on the frame members 22 and 26. The numeral 48 refers to a spring assembly operatively connected to the plates 32 and 34 for returning the cylinder 40 to its lowermost position which causes the trojan bars to move to the right from the driving position. It is this conventional water drive apparatus which is converted to air drive.

The numeral 50 refers to an alignment panel which is mounted on the drive unit and which is connected to the existing alignment or control arm 52. As seen in FIG. 2, the alignment panel 50 includes an alignment cam 54 rotatably mounted thereon about a horizontal axis referred to generally by the reference numeral 56. As seen in FIG. 2, alignment cam 54 is provided with a notch 58 formed in its periphery defined by shoulders 60 and 62. Cam 54 is also provided with a cam surface 64 formed in the periphery thereof having shoulder 66 at one end thereof. Arm 68 is secured to cam 54 by welding or the like and extends downwardly therefrom. Spring 70 is connected the arm 68 and the alignment panel 50 to urge the cam 54 in a counterclockwise direction as viewed in FIG. 2 and to resist the clockwise movement of the cam 54 as viewed in FIG. 2. Turnbuckle 72 connects the arm 68 and the alignment rod 74. Alignment arm 74 is rigidly connected to the control arm 52 by bracket 76.

The cylinder 40 is modified to provide a pneumatic seal 78 on the pipe 42 rather than the water seal previously mounted thereon. A plastic backing plate 80 is also mounted on the pipe 42 so that the seal 78 and backing plate 80 act as a piston. An air line 82 is extended through the casting 44 and pipe 42 so that the inner end thereof extends through the fitting 127 so that air is supplied into the compartment area of the cylinder referred to generally by the reference numeral 84. Line 82 is connected to a three-way cylinder control valve 86 which is operatively mounted on the casting 44 by bracket 88. Valve lever 90 of valve 86 is pivotally connected to a clevis element 92 and 94. Rod 96 extends upwardly from clevis element 92 and extends through a guide member 98 which is attached to and free to rotate between the arms 36 and 38. Pin 100 is secured to rod 96 adjacent the upper end thereof and is adapted to engage the guide member 98 as does the clevis element 92 as will be described in more detail hereinafter.

Alignment valve 102 is mounted on the alignment panel 50 and has air inlet and outlet lines 104 and 106 operatively connected thereto. Alignment valve 102 has a plunger 108 and roller 110 mounted thereon which is adapted to be engaged by the shoulder 66 on the alignment cam 54 upon sufficient clockwise rotation of alignment cam 54 so that the alignment valve 102 is opened to permit air to be supplied on line 106.

The numeral 112 refers to a safety valve mounted on alignment panel 50 having an air inlet line 114 in communication therewith. Safety valve 112 is normally closed and has a plunger 116 extending therefrom which has a roller 118 mounted thereon adapted to engage the shoulder 60 or 62 upon predetermined rotation of the alignment cam 54 to a predetermined position. As previously stated, safety valve 112 is normally closed but is exhausted to the atmosphere upon being opened as will be described in more detail hereinafter.

The numeral 120 refers to a power unit which is preferably installed at the location of the center pivot. Power unit 120 may either be an electric motor or a gasoline engine so as to supply power to an air compressor 122. Air compressor 122 is conventionally connected to a surge tank 124 by air line 126. A conventional high-low pressure switch 128 is connected to the surge tank 124 and is designed to deactivate the system if abnormally high or low air pressures are experienced within the surge tank 124. Surge tank 124 is connected to a cooling coil or apparatus 130 by line 132. Cooling apparatus 130 is connected to a conventional filter 134 by line 136. Filter 134 has an air line 138 extending therefrom which extends to the drive units on all of the drive towers. As illustrated in FIG. 2, line 138 is connected to the line 140 at 142 and is connected to a lubricator 144 which is connected to line 104.

Except for the lead tower as will be described hereinafter, the operation of the apparatus is as follows. Water is supplied through the pipe 12 to the various sprinkler heads provided thereon and compressed air is furnished to the tank 124 from the compressor 122. The air is piped to the tank 124, thence through the cooling apparatus 130 and thence into the moisture trap or filter 134. The air is supplied to the connection referred to generally by the reference numeral 142. The connection 142 would be provided at the Number One tower, that is the tower closest to the central pivot point, to permit the compressed air to pass through the line 140 to the control means on the Number One tower and to pass through the line 146 to the other drive towers in the system. As previously stated, an alignment panel 50 is provided on each of the towers (except the lead or outer tower) for maintaining proper alignment of the individual drive units. Ordinarily, air under pressure is always supplied to the drive means on the lead tower when the system is operating so that the lead tower is being constantly propelled.

As previously stated, the numeral 52 refers to an alignment or control arm which is of conventional design and which senses misalignment of the individual tower with respect to the adjacent tower. As stated, alignment valve 102 is normally closed but is opened by the alignment cam 54 as soon as the tower becomes out of alignment with the adjacent tower. When valve 102 is opened, air would pass through the alignment valve 102 so as to be supplied to the valve 86. As the spring 48 returns the cylinder 40 to its downward position, the guide member 98 engages the clevis element 92 so that the control rod 96 is moved downwardly to the down position which in turn moves the valve lever 90 to its downward position resulting in the valve 86 being opened. As the valve 86 opens, the system pressure flows through line 82 into the cylinder forcing the cylinder to move upwardly moving the drive unit forward through the mechanical drive linkage (trojan bars). As the cylinder 40 reaches its upwardmost position, the guide member 96 engages the pin 100 to move the control rod 96 to its upper position which in turn moves valve lever 90 to its upper position resulting in the valve 86 being closed. As valve 86 is closed, the cylinder pressure is exhausted through line 82 and valve 86. As cylinder pressure is exhausted, the spring 48 returns the cylinder 40 to its downward position and a new cycle is commenced.

Figure 3:
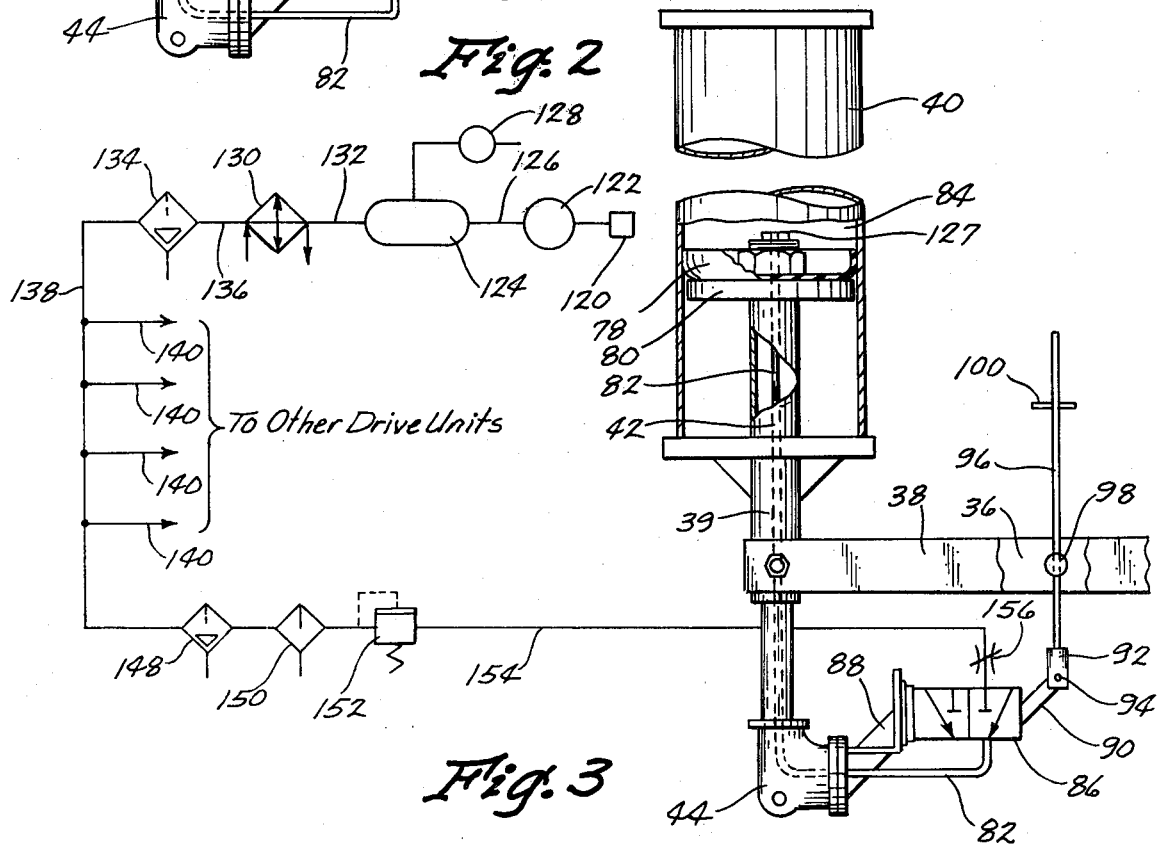
FIG. 3 is a view similar to FIG. 2 except that it shows the circuitry for the lead tower.

FIG. 3 is a schematic of the circuitry used in furnishing system pressure to the lead tower. This circuitry is unique in that an alignment control is not needed. System pressure flows to the lead tower through a filter 148, lubricator 150 and sequence valve 152. From the sequence valve 152, the system pressure flows through line 154 to the valve 86 and cylinder 40. A needle valve 156 is installed in line 154 ahead of the valve 86 to provide a means of controlling the speed of the lead tower cylinder 40 which in turn controls the speed of the entire system through the alignment controls at each intermediate tower.

As the spring 48 returns the cylinder 40 to its downward position, the guide member 98 engages the clevis 92 moving the control rod 96 to the down position which in turn moves valve lever 90 to its downward position resulting in the valve 84 being opened. As the valve 84 is opened, the system pressure flows through the line 82 into the compartment area 84 of cylinder 40 forcing the cylinder to move upwardly moving the drive unit forward through the mechanical drive linkage. As the cylinder 40 reaches its uppermost position, the guide member 98 engages the pin 100 moving the control rod 96 to the upper position which in turn moves the valve lever 90 to its upward position resulting in valve 86 being closed. As the valve 86 is closed, the cylinder pressure is exhausted through line 82 and valve 86. As cylinder pressure is exhausted, the spring 48 returns the cylinder 40 to its downward position and a new cycle is commenced.

The sequence valve 152 is installed in the circuit on the lead tower so as to prevent the flow of air to the lead tower cylinder until such a time as the system pressure has built up to a level sufficient to power the entire system. The use of the sequence valve in the lead tower circuit provides a back-up safety system. If a drive unit should fail to move, the safety valve 112 is opened and system pressure is vented to the atmosphere. As the pressure drops below the sequence valve setting, the lead tower will stop; preventing any structural damage to the system even if the pressure sensitive safety switch 128 malfunctions.

Thus it can be seen that the conventional water drive of a center pivot irrigation system may be modified so as to accommodate air drive with a minimum of modification of the existing system.

FIGS. 4 and 5 illustrate a second method of converting the water drives of the center pivot systems to air drives. Where appropriate, identical reference numerals will be used in FIGS. 4 and 5.

In FIG. 4, the original water cylinder 40 is converted to a pneumatic cylinder. The original water seal is removed and an air seal 78 is installed in its place backed up by a plastic bearing plate 80 which acts as a piston. The original water pipe (42) is removed and replaced with a cylinder rod 158. The cylinder rod 158 is attached to the cast-iron fitting 44 which is secured in its original mounting within the structural parts of the drive unit. The original cast-iron yoke assembly 39 is modified and is referred to generally by the reference numeral 160. Assembly 160 is modified to accept a three-way plunger operated valve 162 thereon and is attached to the drive mechanism as previously described. A three-way plunger operated valve 164 is mounted in the opposite end of the cylinder 40. As seen in the drawings, the plungers 166 and 168 of valves 162 and 164 are positioned within the interior of the cylinder and are adapted to be engaged by the piston. Pressure is supplied to valve 164 by line 106 while pressure is supplied to valve 162 by means of line 170. Installing line 170 in the circuit ahead of the alignment valve 102 furnishes full system pressure to valve 162 at all times that the system is in operation.

As in the embodiment previously described, a spring 48 is utilized to return the cylinder at the end of each power stroke. Thus, the water cylinder is converted to and used as a single acting pneumatic cylinder.

As previously described, when a drive unit becomes out of proper alignment, the alignment valve 102 is opened allowing system pressure to flow through the line 106 to the three-way valve 164. With valve 164 opened, the pressure flows through line 172 into the cylinder forcing the cylinder to the extended position and moving the drive unit forward through the drive mechanism. As the cylinder completes its extended stroke, the bearing plate 80 engages the valve plunger 166 to open valve 162. As valve 162 is opened, the system pressure is directed through line 174 to the pilot chamber of valve 164 closing the valve 164 and allowing the cylinder pressure to be exhausted through line 172 causing the cylinder spring 48 to return the cylinder to the retracted position. As the cylinder 40 reaches the end of the retracted stroke, the end of the cylinder rod 158 engages the plunger 168 opening the valve 164 allowing system pressure to flow into the cylinder to commence another cycle. As the drive unit moves into proper alignment, the alignment valve 102 closes shutting off the flow of system pressure and preventing the cylinder from further stroking. The positioning of the valves in the opposite ends of the cylinder ensures that the cylinder will be completely extended and retracted in each cycle.

FIG. 5 is a schematic view of the circuitry used in furnishing system pressure to the lead tower when the embodiment of FIG. 4 is employed. This circuitry is also unique in that an alignment control is not needed. System pressure flows through the lead tower through a filter 148, lubricator 150 and sequence valve 152. From the sequence valve 152, flow is directed to the cylinder 40 through lines 170 and 176. A needle valve 156 is installed in line 176 ahead of the valve 164 for the purpose of controlling the speed of the lead tower cylinder which in turn controls the speed of the entire system through the alignment controls at each intermediate drive unit. As system pressure flows through valve 164 and line 172 into the cylinder, the cylinder is forced to the extended position moving the drive unit forward. As the cylinder completes its extended stroke, the bearing plate 80 engages the valve plunger 166 opening the valve 162. As valve 162 is opened, the system pressure is directed through line 174 to the pilot chamber of valve 164 closing the valve 164 and allowing cylinder pressure to be exhausted through line 172 causing the cylinder spring 48 to return the cylinder to the retracted position. As the cylinder reaches the end of the retracted stroke, the end of the cylinder rod 158 engages the plunger 168 opening the valve 164 allowing system pressure to flow into the cylinder to commence another cycle.

The sequence valve 152 is installed in the circuit on the lead drive unit so as to prevent the flow of air to the lead tower cylinder until such a time as the system pressure has built up to a level sufficient to power the entire system. The use of the sequence valve in the lead drive unit circuit provides a back-up safety system. If the drive unit should fail to move, the safety valve 112 is opened and system pressure is vented to the atmosphere. As the pressure drops below the sequence value setting, the lead tower will stop thereby preventing any structural damage to the sprinkler system even if the pressure sensitive safety switch 128 malfunctions.

Figure 6:
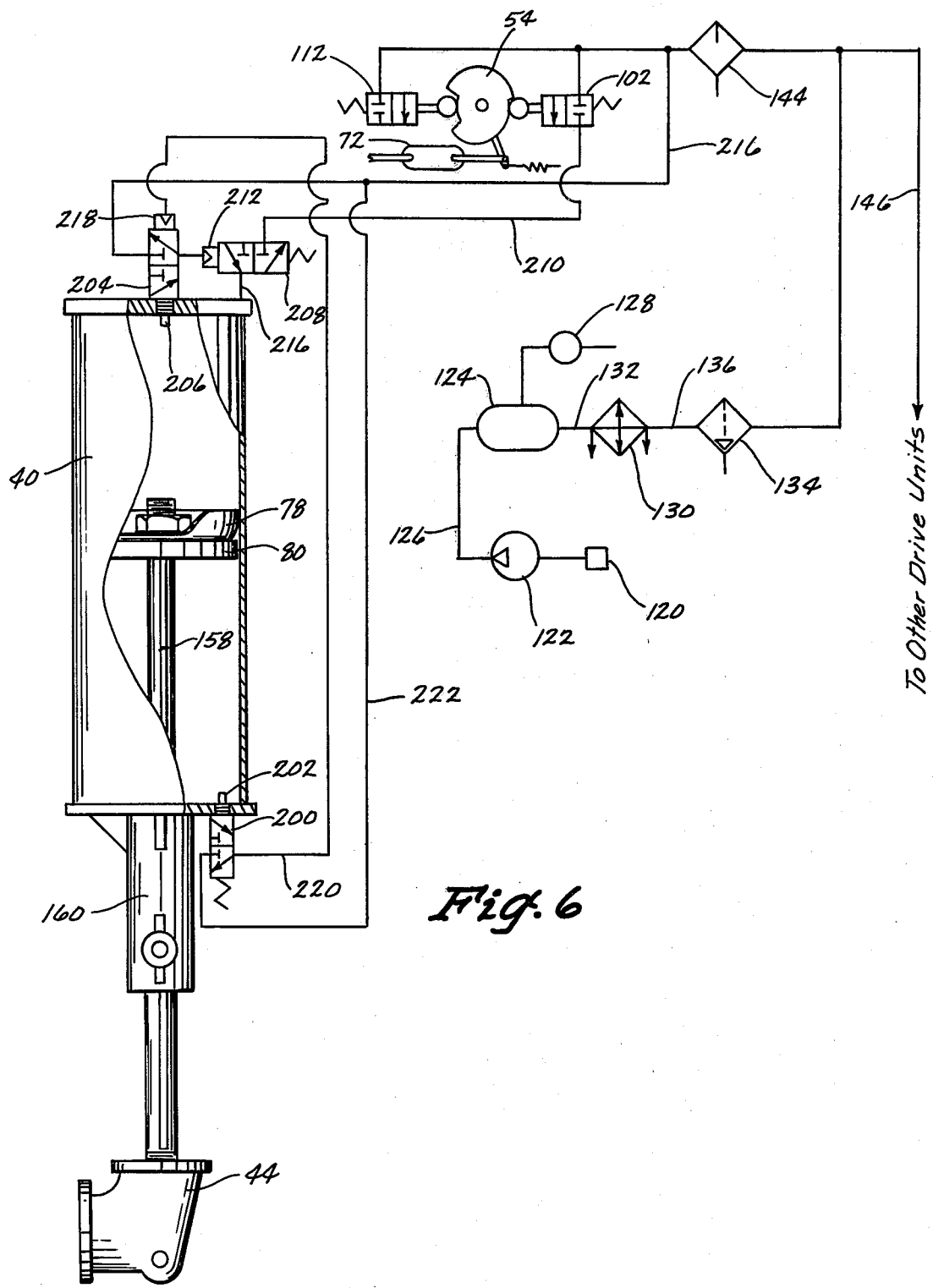
FIG. 6 is a schematic view of a still further modified form of the air drive conversion.

FIG. 6 illustrates a third method of converting the water drives of the center pivot systems to air drives. Where appropriate, identical references numerals will be used in FIG. 6. In FIG. 6, the original water cylinder 40 is converted to a pneumatic cylinder. The original water seal is removed and air seal 78 is installed in its place backed up by a plastic bearing plate 80 which acts as a piston. The original water pipe is removed and replaced with a cylinder rod 158. The cylinder rod 158 is attached to the cast-iron fitting 44 which is secured in its original mounting within the structural parts of the drive unit. The original cast-iron yoke assembly 39 is modified and is referred to generally by the reference numeral 160. Assembly 160 is modified to accept a three-way, plunger operated, normally closed, spring return valve 200 having plunger 202 positioned within the base end of the cylinder 40.

A three-way, plunger and pilot operated valve 204 is mounted on the other end of the cylinder and has plunger 206 positioned within the interior of the upper end of the cylinder as illustrated in FIG. 6. The reference numeral 208 refers to a three-way, pilot operated, normally closed, spring return valve which is mounted at the upper end cap of the cylinder. The inlet of the valve 208 is connected to the alignment valve 102 by line 210. The pilot section 212 of valve 208 is connected to the exhaust side of valve 204 by line 214. Valve 208 has an outlet connected to the upper interior end of cylinder 40 by line 216. As seen in FIG. 6, the inlet side of valve 204 is connected to the system pressure upstream of the alignment valve 102 by means of line 216. The pilot section or chamber 218 of valve 204 is connected to valve 200 by line 220. Line 222 connects 216 with the inlet of valve 200.

As the cylinder reaches the end of its retracted stroke, cylinder rod 151 engages valve lever 206 thereby opening valve 204. While it is described that the cylinder rod itself engages the valve plunger 206, it should be understood that the valve plunger 206 could be positioned within the cylinder 40 so as to be engaged by the piston rather than the cylinder rod. The opening of valve 204 by the engagement of the rod 158 with the valve plunger 206 allows system pressure to flow through line 216 and valve 204, through line 214 and into the pilot portion 212 of valve 208. This opens valve 208 allowing system pressure to flow through line 210 from the alignment valve 102, through valve 208 and into the cylinder 40 causing the cylinder to commence an extending stroke.

As the cylinder 40 reaches the end of the extended stroke, the bearing plate 80 engages the valve plunger 202 thereby opening valve 200. As valve 200 opens, system pressure is allowed to flow through line 216, line 222, valve 200, and line 220 into the pilot chamber of valve 204. As system pressure flows into the pilot chamber of valve 204, it causes valve 204 to close thereby exhausting system pressure from the pilot chamber of valve 208. As system pressure is exhausted from pilot chamber of valve 208, valve 208 closes causing the system pressure to be exhausted from the cylinder 40 through the exhaust port of valve 208. As system pressure is exhausted from cylinder 40, the cylinder is retracted by the return spring 48, and another cycle is commenced.

It can be seen that the embodiment of FIG. 6 insures that the cylinder will be fully retracted and extended and will efficiently perform with reliability.

Thus it can be seen that the method and means accomplishes at least all of its stated objectives.

I claim:
1. A self-propelled sprinkling system comprising,
 a water supply pipe movable about a center pivot point,
 a plurality of spaced-apart, wheeled drive towers supporting said supply pipe above the area to be sprinkled,
 each of said towers comprising a frame means having a pair of spaced-apart drive wheels rotatably mounted thereon,
 a trojan bar means reciprocatably mounted on said frame means and movable between first and second positions for engagement with at least one of said drive wheels for driving said wheel when said trojan bar means moves in at least one direction,
 an air operated drive means on each of said towers to propel said towers to move said towers and supply pipe about said center pivot point,
 a source of compressed air for supplying air under pressure to said drive means,
 said air operated drive means comprising an air cylinder mounted on said frame means and being operatively connected to said trojan bar means to reciprocate said trojan bar means, said air cylinder being movable between extended and retracted positions,
 and a control means for controlling the operation of said air cylinders so that the associated tower is propelled at the desired rate relative to the other towers in the system,
 said control means including means operatively connected to the source of air pressure and said air cylinder for automatically moving said air cylinder between its fully extended and retracted positions so that said trojan bar means is fully reciprocated between its said first and second positions,
 said air cylinder having first and second ends,
 said air cylinder having first and second valves mounted on its said first and second ends respectively which have valve plungers positioned in said air cylinders and which are operatively engaged by the piston of said air cylinder when said air cylinder is moved to its fully extended and retracted positions respectively,
 said first valve being a three-way, normally closed, plunger and pilot operated valve which is opened when said air cylinder is fully retracted, said first valve having an inlet connected to said source of air pressure, said second valve being a three-way, plunger operated, normally closed, spring return valve which is opened when said air cylinder is fully extended,
 a three-way, pilot operated, normally closed, spring return valve having a pilot portion connected to the outlet of said first valve and an outlet connected to the interior of said air cylinder adjacent said first end,
 said control means including an alignment control valve having an inlet operatively connected to said source of air pressure, said alignment control valve permitting system air pressure to flow from its outlet upon being actuated, the outlet of said alignment control valve being connected to said three-way piloted operated valve, the pilot portion of said first valve being connected to said second valve, said second valve being connected to said source of air pressure, said first valve opening when said air cylinder is fully retracted to permit system pressure to flow through said first valve to the pilot portion of said three-way, pilot operated valve to open said three-way, pilot operated valve so that air from said alignment control valve flows into said air cylinder to cause said air cylinder to commence an extending stroke, said second valve being opened when said air cylinder is fully extended so that system pressure flows into the pilot portion of said first valve to close said first valve thereby exhausting system pressure from the pilot portion of said three-way, pilot operated valve to close said three-way, pilot operated valve and to exhaust the pressure from said air cylinder, and means operatively connected to said air cylinder to retract said cylinder upon said air cylinder being exhausted.

* * * * *